United States Patent [19]

Stine

[11] Patent Number: 4,514,086
[45] Date of Patent: Apr. 30, 1985

[54] APPARATUS FOR MEASURING REFRACTIVE PROPERTIES OF LENSES AND OTHER TRANSMISSIVE DEVICES

[76] Inventor: Edward V. Stine, 247 Congressional La., Rockville, Md. 20852

[21] Appl. No.: 337,275

[22] Filed: Jan. 5, 1982

[51] Int. Cl.³ .............................................. G01B 9/00
[52] U.S. Cl. .................................... 356/124; 350/633
[58] Field of Search ...................... 356/124, 125, 127; 350/289, 310, 486, 487

[56] References Cited

U.S. PATENT DOCUMENTS

| | | | |
|---|---|---|---|
| 2,945,187 | 7/1960 | McCollom | 356/132 |
| 3,574,448 | 4/1971 | Paine et al. | 350/310 |
| 3,832,066 | 8/1974 | Cornsweet | 356/125 |
| 3,870,415 | 3/1975 | Cornsweet | 356/124 |
| 3,947,126 | 3/1976 | Mendez | 356/150 |
| 4,007,990 | 2/1977 | McDevitt et al. | 356/124 |
| 4,060,314 | 11/1977 | Heinz | 350/486 |
| 4,068,935 | 1/1978 | Koester et al. | 350/255 |
| 4,101,205 | 7/1978 | Bös | 350/289 |
| 4,114,988 | 9/1978 | Enomoto | 350/289 |
| 4,370,058 | 1/1983 | Trotscher et al. | 356/125 |
| 4,381,895 | 5/1983 | Hughes et al. | 356/134 |

Primary Examiner—R. A. Rosenberger
Attorney, Agent, or Firm—Walter F. Wessendorf, Jr.

[57] ABSTRACT

An apparatus for measuring refractive properties of transmissive elements such as ophthalmic lenses, including a mirror or deflective surface supported for adjustable movement in X and Y directions in order to deflect a light or other beam onto a detector which provides an output proportional to the deviation of the deflected beam from a null point when a lens or other transmissive element is positioned in the beam path; the output being arranged to drive a pair of servomotors, each coupled to a potentiometer connected to electrical circuits for indicating the position of the mirror or deflective surface in the X and Y directions and in conjunction with the light detector output, to return the deflected beam to the null point; simultaneously varying the resistance of the coupled potentiometers whereby the voltage output of the electrical circuits indicate refractive properites of the lens/transmissive elements.

3 Claims, 4 Drawing Figures

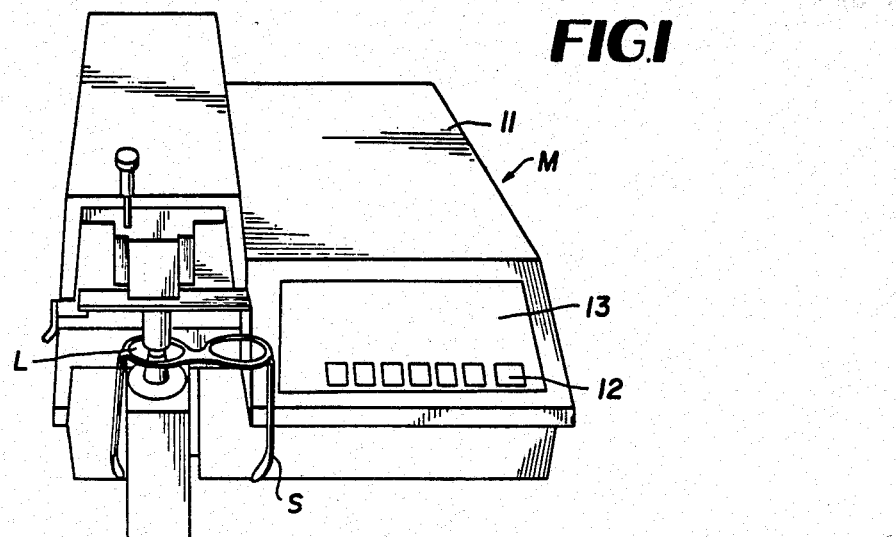
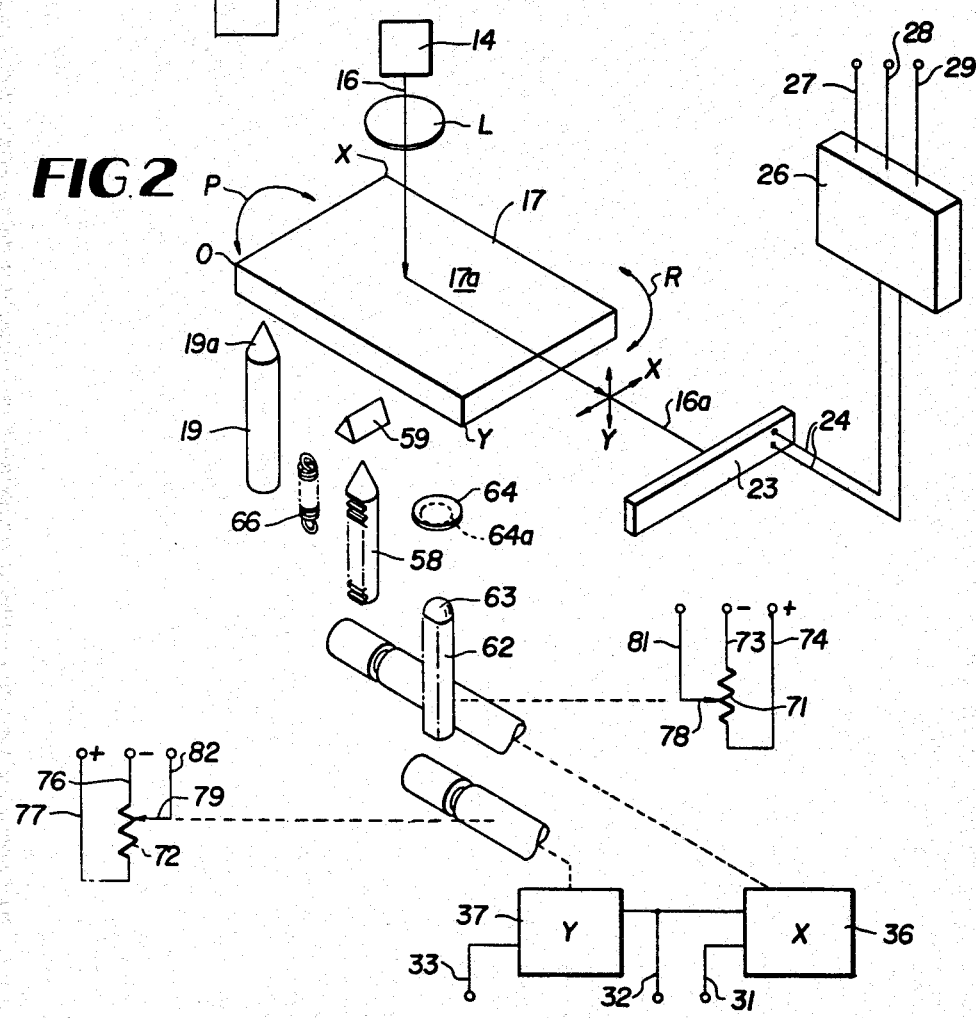

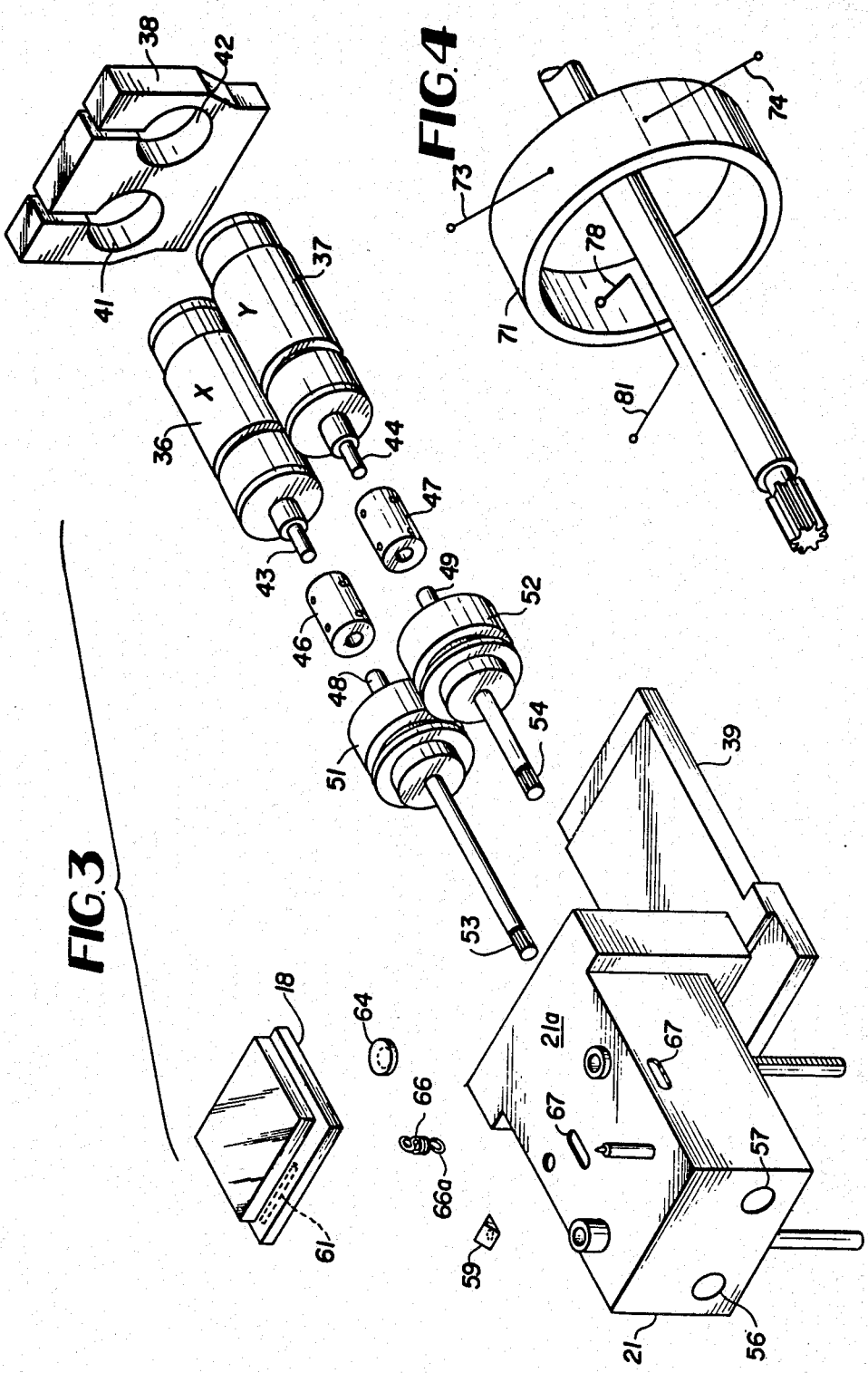

APPARATUS FOR MEASURING REFRACTIVE PROPERTIES OF LENSES AND OTHER TRANSMISSIVE DEVICES

BACKGROUND OF THE INVENTION

Many devices are marketed today for measuring and/or analyzing the refractive properties of transmissive devices. A specific area is well known to be in optical systems including ophthalmic lenses. Various issued patents are directed to such devices such as prior issued U.S. Pat. No. 3,832,066—Cornsweet, issued Aug. 27, 1974 and U.S. Pat. No. 3,870,415—Cornsweet, issued Mar. 11, 1975, and U.S. Pat. No. 4,007,990—McDevitt, Jr. et al. An example of such commercially available devices, is one marketed today and commercially available from Acuity Systems, Inc., of Reston, Va., known as an AUTO-LENSMETER. Such AUTO-LENSMETER combines a microcomputer and sophisticated laser technology to provide precise measurements of sphere, cylinder, axis and prism of a lens which are digitally displayed on a screen in standard prescription notation.

The basic concept embodied in such prior art devices is the utilization of a light beam source and a position-sensitve photoelectric detector surface which when the light beam is refracted by the lens under test, a corresponding deviation of the light beam from its normal path is detected by the light detector. The amount of deviation of a light beam which reflects the various refractive parameters of the lens under test is measured and an electrical output is produced which is electrically processed to provide an output indication representing one or more of the reflective properties of the optical system under test. Such deviation is detected by the use of a reflective surface, such as a mirror, which is mechanically adjusted to return the deviated light beam to its normal axis, the extent of such movement of the reflective surface or mirror providing, from the light detector, the electrical output signal which is processed for the display of the refractive parameters.

While such prior art devices provide extremely precise measurements, they fall short of the degree of automation and efficiency desired. This limitation is apparent through the necessity for manual manipulation of the adjustment mechanism to move the reflective surface back to its original position from the path of the deviated light beam; such as the thumbscrews in the aforementioned U.S. Pat. No. 4,007,990. Not only does the use of such manually operated adjustment mechanisms require specific skills not infrequently reducing the degree of accuracy available in such devices, but additional time is consumed in making the adjustment relegating such present-day devices to a semi-automatic and costly status.

OBJECTS AND SUMMARY OF THE INVENTION

Accordingly, a primary object of this invention is to provide a new and novel apparatus for measuring the refractive properties of ophthalmic lenses which is completely automatic in operation.

Another object of this invention is to provide a new and novel apparatus for measuring the refractive properties of ophthalmic lenses which is extremely precise in operation so as to provide an exact measurement of the refractive parameters of the lenses.

Still another object of this invention is to provide a new and novel apparatus for measuring the refractive parameters of a lens which is composed of a minimum of parts, which is simple and inexpensive in construction, and which may be operated by a relatively unskilled operator without affecting the preciseness of the measurements obtained.

The object of the invention and other related objects are accomplished by providing a light source for projecting a light beam in a linear path onto a mirror disposed in the path of the beam for deflecting the beam. The mirror is supported for adjustable movement in an X direction and a Y direction and is disposed in a normal position for deflecting the light beam in a predetermined path in the absence of a refractive lens in the beam path between the light source and mirror. Thus, the light beam is deflected from the predetermined path in the presence of a lens to be tested in the beam path by a deviation corresponding to the refractive parameters of the lens and detection means are provided for detecting the deviation of the deflected beam from the predetermined path. The detection means provides an output signal corresponding to the deviation of the light beam which, in association with means responsive to the output signal, move the mirror in the X and Y directions on the supporting means to deflect the light beam back to the predetermined path and means are provided for measuring the movement required to move the mirror to return the deviated beam to the predetermined path thereby providing a measurement of the refractive parameters of the lens.

The invention will be better understood, and further objects and advantages thereof will become more apparent from the ensuing detailed description of the preferred embodiment taken in conjunction with the drawings.

BRIEF DESCRIPTION OF THE DRAWINGS

FIG. 1 is a front view of a lens meter incorporating the apparatus of the invention;

FIG. 2 is a schematic exploded view of the apparatus of the invention;

FIG. 3 is an exploded perspective view of the apparatus of the invention; and

FIG. 4 is a perspective view of component parts of the apparatus of FIG. 3.

DESCRIPTION OF THE PREFERRED EMBODIMENT

Referring now to the drawings and to FIG. 1 in particular, there is shown an apparatus constructed in accordance with the invention for measuring the refractive parameters of an optical lens which is designated generally by the letter M. The apparatus M is utilized to automatically measure the refractive parameters of a lens such as a lens L in spectacles S or the like, and is identified commercially an an AUTO-LENSMETER. The apparatus M includes a housing 11 which is provided with suitable pushbutton controls 12 and a digital display 13 for displaying the refractive parameters of the lens L. As is well known, such refractive parameters include spherical power, cylindrical power, cylinder axis, prism power and prism axis.

Referring now to FIG. 2, the apparatus M includes a light source 14, such as a laser or the like, for producing a beam of radiation 16 which is directed in a straight line onto the upper surface of a reflective surface or mirror 17 preferably mounted on a planar base 18 as shown in FIG. 3. The spatial orientation of the mirror 17 is defined by points O, X, and Y as indicated in FIG. 2. Point O is a fixed pivot point with the mirror 17 being movable around such fixed pivot point O in the X direction as defined by the double arrow P and in a Y direction as defined by the double arrow R, as will be explained in detail hereinafter. The mirror 17 is supported at the fixed pivot point O by engagement of a bearing pin 19 having a conical tip 19a engageable with a suitably provided recess in the underside of the base 18. As will be explained in detail hereinafter, the bearing pin 19 is supported on the upper surface 21a of a mounting block 21 as shown in FIG. 3.

The light beam 16 is normally reflected from the mirror surface 17a in a predetermined path 16a for impingement on the surface of a linear radiation detector 23 of conventional construction adapted to provide output signals. The linear radiation detector 23 is capable of monitoring the point at which the light beam 16 strikes its surface and when the radiation or light beam 16 impinges in its normal predetermined path on the surface of detector 23, it impinges at the electro-geometric center (null) of the detector, at which point no output signals are provided from the detector 23. If the light beam 16 impinges on the surface of the detector 23 at a deviation from the null, output signals are developed in the detector 23 corresponding to the extent of such a deviation and are fed through conductors 24 to a signal processor 26 also of conventional construction.

The signal processor 26 is connected by means of conductors 27, 28, 29 to conductors 31, 32, 33, respectively connected to two servomotors 36, 37 as shown best in FIG. 2.

The servomotors 36, 37 shown in the schematic diagram of FIG. 2 are arranged to move the mirror 17 in the X and Y directions, respectively, by means of the arrangement shown in FIG. 3. Referring now to FIG. 3, the servomotors 36, 37 are suitable supported in an upstanding bracket 38 mounted on a base plate 39, the servomotors 36, 37 being arranged in suitably provided openings 41, 42, respectively, in the bracket 38. The servomotors 36, 37 are provided with output shafts 43, 44, respectively, connected by means of couplings 46, 47 to the rotatably mounted shafts 48, 49 of potentiometers 51, 52, respectively. The through shafts 48, 49 are provided at their outer ends with pinions 53, 54, respectively, and the shafts 48, 49 are arranged to be received within suitably provided bores 56, 57 in the mounting block 21.

Pinion 53 is arranged in meshing engagement with an upstanding rack 58 arranged for vertical sliding movement within a suitably provided aperture in the block 21. The upper end of the rack 58 is preferably conically shaped for engagement with an intermediate wedge-shaped bearing 59 which is received within a groove 61 suitably provided in the underside of the mirror base 18. The groove 61 is disposed normal to a line extending between the points O and Y, so as to allow a predetermined degree of movement and a sliding bearing surface along a line between the points O and X. It should be understood that the wedge-shaped bearing 59 may be dispensed with by suitably shaping the end of the rack 58 to fit within the groove 61.

The pinion 54 is similarly arranged to engage a rack 62 suitably disposed for vertical sliding movement within an aperture in the mounting block 21. The rack 62 is preferably provided with a spherical upper end 63 and is received within a depression 64a in a flat washer 64. The flat washer or bearing 64 has a smooth, uniform upper surface for engagement with the underside of a base 18 and the vertical movement of the rack 62 driven by the pinion 54 determines the position of point Y. Similarly with X, the washer or bearing 64 may be dispensed with and the tip 63 of rack 62 disposed indirect engagement with the underside of the base 18.

Means are provided for yieldingly urging the base plate 18 together with the mirror 17 downwardly into engagement with the pivot bearing 19 and racks 58, 62. More specifically, a spring 66 is connected at one end to the underside of base 18 and at its other end within a suitable opening 67 within the mounting block 21. The connection of the lower end 66a of spring 66 with the mounting block 21 is accomplished by insertion of a pin or the like within a suitably provided aperture 67 in a mounting block 21. Accordingly, the extension spring 66 exerts a constant tension upon the centroid of the area defined by line O-X, line X-Y and line Y-O. Thus, with this arrangement, the base 18, with the mirror 17 disposed thereon, is maintained in intimate contact with the pivot bearing 19 and racks 58, 62. Therefore, movement of the mirror 17 is responsive yet positive and non-erratic. In addition, this arrangement serves to provide an anti-backlash effect for the rack and pinion gearing by placing a continuous nominal force upon racks 58, 62, thereby providing constant meshing between the teeth of the rack and the pinions.

Each of the potentiometers 51, 52 include resistive elements 71, 72, one of such resistive elements 71 for the potentiometer 51 being shown in FIG. 4. The resistive elements 71, 72 are in the form of a cylindrical element having ends connected by means of conductors 73, 74 and 76, 77 to a source of D.C. power. Each of the potentiometers 51, 52 includes a movable contact 78, 79, respectively which are connected by means of conductors 81, 82, respectively, to a suitable meter or display device (not shown) for displaying the lens parameters on a suitable display panel, such as panel 13, in the unit of FIG. 1.

The contacts 78, 79 are suitably mounted on the potentiometer shafts 53, 54, respectively, for movement therewith so that the contacts determine the amount of resistance in the respective circuits corresponding to the movement of the potentiometer shafts. It should be noted that the potentiometers 51, 52 are not servo feedback parts in the usual sense, but rather are proportional potentiometric indicators of the amount of offset of the beam 16a from the null determined by the linear detector 23. Thus, the outputs of the potentiometers 51, 52 when monitored and interpreted provide an indication as to the amount of deviation of the beam 16a from the detector null and therefore are directly correlated to the X and Y components of the radiated beam deviation produced when the lens or transmissive element L is inserted within the path of the beam 16 between the light source 14 and the mirror 17.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An apparatus for automatically measuring the deflection of a radiation beam for determining certain parameters of a diverting means, said apparatus comprising: a radiation generating means, a reflective surface of a substantially planar base, a supporting means, a first rack means, a second rack means, radiation detection means, drive means, signal processing means, spring means and measuring means; said radiation generating means directing a beam of radiation onto said reflective surface, said diverting means being interposed between said radiation generating means and said reflective surface for deflecting said radiation beam, said supporting means supporting said base upon a fixed pivot for movement of said base in mutually-perpendicular X and Y plane, said first rack means being operatively connected to said base to move said base in said X plane about said fixed pivot, said second rack means being operatively connected to said base to move said base in said Y plane about said fixed pivot, said radiation detection means detecting the amount of deviation of the deflected radiation beam, said drive means including respective servo motors having respective shafts provided with first and second pinions, said signal processing means being responsive to said radiation detection means to actuate said servo motors to rotatively drive said shafts, said first and second pinions operatively engaging said first and second rack means, respectively, to move said base to a null position as defined by the deviation of the deflected radiation beam, said spring means being operatively connected to said base and said first and second rack means to constantly urge said base against said first and second rack means and to maintain said pinions in constant mesh with said respective rack means to preclude backlash, and said measuring means being operatively associated with the rotation of said respective shafts to measure the amount of the deviation in said X and Y planes.

2. An apparatus in accordance with claim 1, wherein said measuring means operatively associated with the rotation of said respective shafts includes potentiometers.

3. An apparatus in accordance with claim 1, wherein said diverting means comprises a lens.

* * * * *